(12) United States Patent
Patil

(10) Patent No.: US 11,727,461 B2
(45) Date of Patent: Aug. 15, 2023

(54) METHOD, SYSTEM AND COMPUTER-READABLE MEDIUM FOR GENERATING PRE-PURCHASING CONFIDENCE RECOMMENDATIONS FOR A USER

(71) Applicant: VISA INTERNATIONAL SERVICE ASSOCIATION, San Francisco, CA (US)

(72) Inventor: Nikhil Patil, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 377 days.

(21) Appl. No.: 16/294,844

(22) Filed: Mar. 6, 2019

(65) Prior Publication Data

US 2020/0286150 A1    Sep. 10, 2020

(51) Int. Cl.
*G06Q 30/06* (2023.01)
*G06Q 30/0601* (2023.01)
*G06F 17/15* (2006.01)
*H04L 67/50* (2022.01)

(52) U.S. Cl.
CPC ......... *G06Q 30/0631* (2013.01); *G06F 17/15* (2013.01); *G06Q 30/0621* (2013.01); *G06Q 30/0633* (2013.01); *G06Q 30/0643* (2013.01); *H04L 67/535* (2022.05)

(58) Field of Classification Search
None
See application file for complete search history.

(56) References Cited

U.S. PATENT DOCUMENTS

| | | | | |
|---|---|---|---|---|
| 8,401,924 B1* | 3/2013 | Rajyaguru | ......... | G06Q 30/0641 705/26.61 |
| 8,442,844 B1* | 5/2013 | Trandal | .................. | G06Q 40/08 705/4 |
| 9,569,419 B1* | 2/2017 | Rice | .................... | G06Q 30/0603 |
| 10,185,982 B1* | 1/2019 | Kane-Parry | ........ | G06Q 30/0631 |
| 2010/0306080 A1* | 12/2010 | Trandal | .................. | G06Q 10/10 705/26.8 |
| 2012/0173351 A1* | 7/2012 | Hanson | .................. | G06Q 20/12 705/17 |

(Continued)

OTHER PUBLICATIONS

Y. Zou, Q. Zhang and X. Zhao, "Improving the Usability of E-Commerce Applications using Business Processes," in IEEE Transactions on Software Engineering, vol. 33, No. 12, pp. 837-855, Dec. 2007, doi: 10.1109/TSE.2007.70709. (Year: 2007).*

*Primary Examiner* — Michelle T Kringen

(74) *Attorney, Agent, or Firm* — K&L Gates LLP

(57) ABSTRACT

A computer-implemented method for generating pre-purchasing confidence recommendations. A browser widget scans post-sale activities of a user and searches for product-specific parameters of items from the scanned purchase records. A system stores the searched product-specific parameters and the post-sale activities in a data storage. The browser widget monitors purchasing activities of the user, and in response to the monitoring, retrieving, relevant product-specific parameters and the post-sale activities matching to the monitored purchasing activities. Based on the retrieving, generating a pre-purchasing confidence recommendation to the user before completion of a purchase by the user.

12 Claims, 12 Drawing Sheets

(56) References Cited

U.S. PATENT DOCUMENTS

| | | | |
|---|---|---|---|
| 2013/0346195 A1* | 12/2013 | Adderton | G06F 40/134 |
| | | | 705/14.51 |
| 2014/0067596 A1* | 3/2014 | McGovern | G06Q 30/0246 |
| | | | 705/26.7 |
| 2015/0039462 A1* | 2/2015 | Shastry | G06Q 30/0631 |
| | | | 705/26.7 |
| 2015/0088642 A1* | 3/2015 | Mathew | G06Q 30/0631 |
| | | | 705/14.51 |
| 2016/0140632 A1* | 5/2016 | Kandala | G06Q 30/0623 |
| | | | 705/26.61 |
| 2016/0343056 A1* | 11/2016 | Hu | G06Q 30/0635 |

\* cited by examiner

FIG. 1

Filter By ‹  [Search] —104
                  —106
         —108

| | Name | Date | Price |
|---|---|---|---|
| ☐ | Men's running shoes | 03/24/2017 | USD $159.00 |
| ☐ | Women's windbreaker | 10/11/2015 | USD $129.99 |
| ☐ | Folding chairs (set of 4) | 07/24/2015 | USD $49.99 |
| ☐ | Air Fryer | 06/16/2015 | USD $59.99 |
| ☐ | Boy's running shoes | 05/29/2015 | USD $39.99 |
| ☐ | Girl's running shoes | 05/29/2015 | USD $49.99 |
| ☐ | Mobile battery bank | 05/28/2015 | USD $29.99 |
| ☐ | Men's basketball mesh shorts | 05/28/2015 | USD $19.99 |
| ☐ | Men's sports gloves | 05/28/2015 | USD $21.99 |
| | | ... | |

102

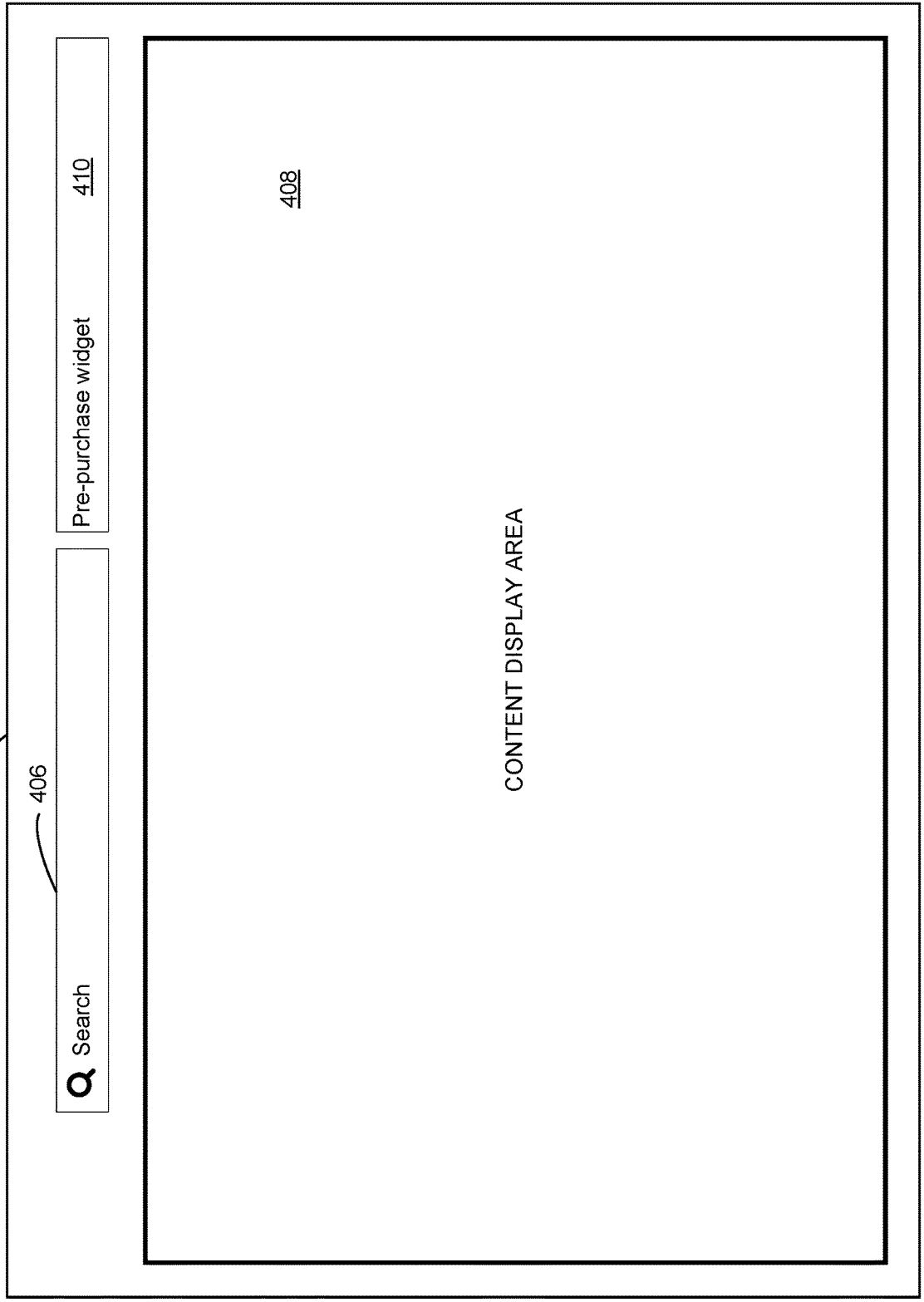

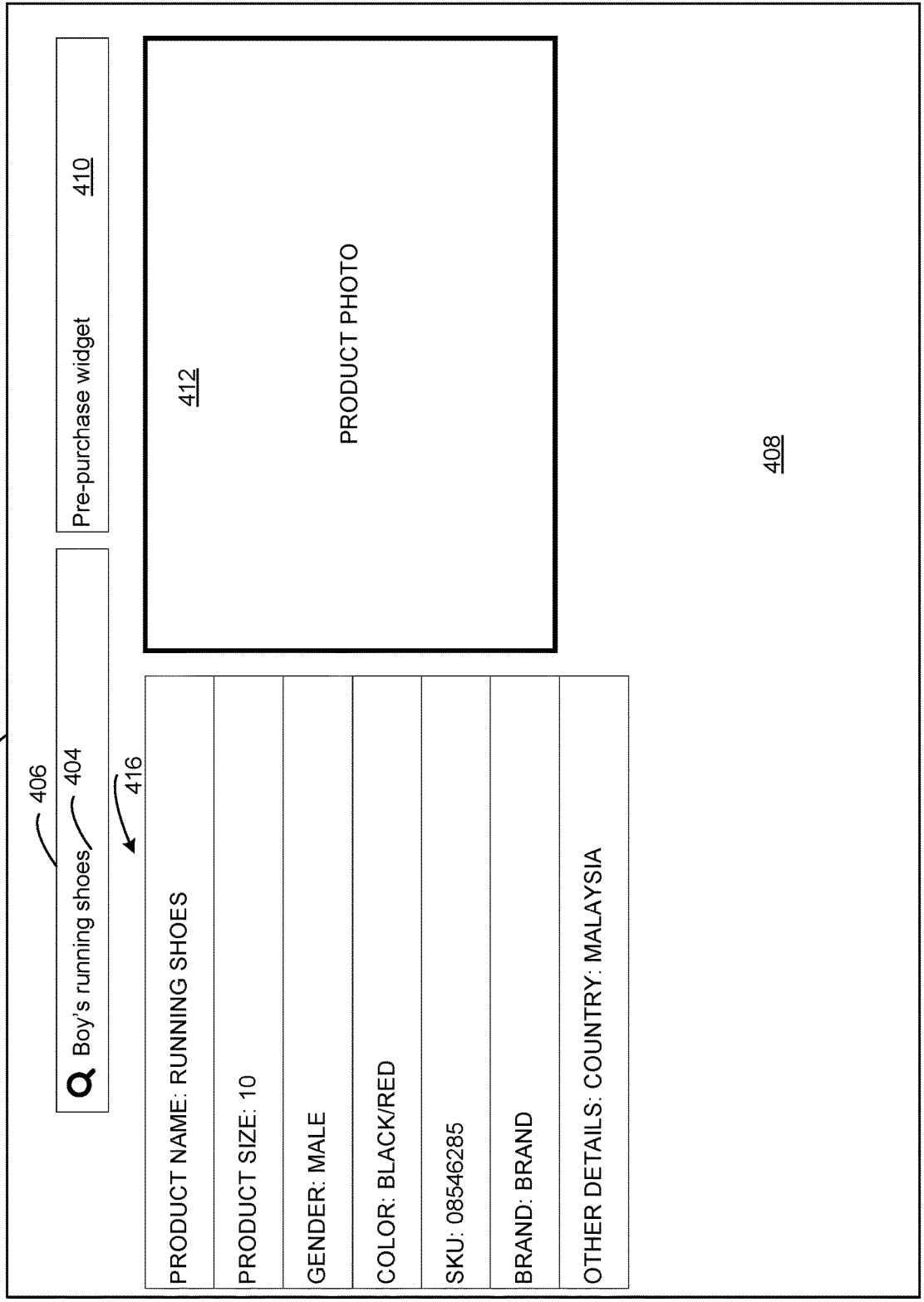

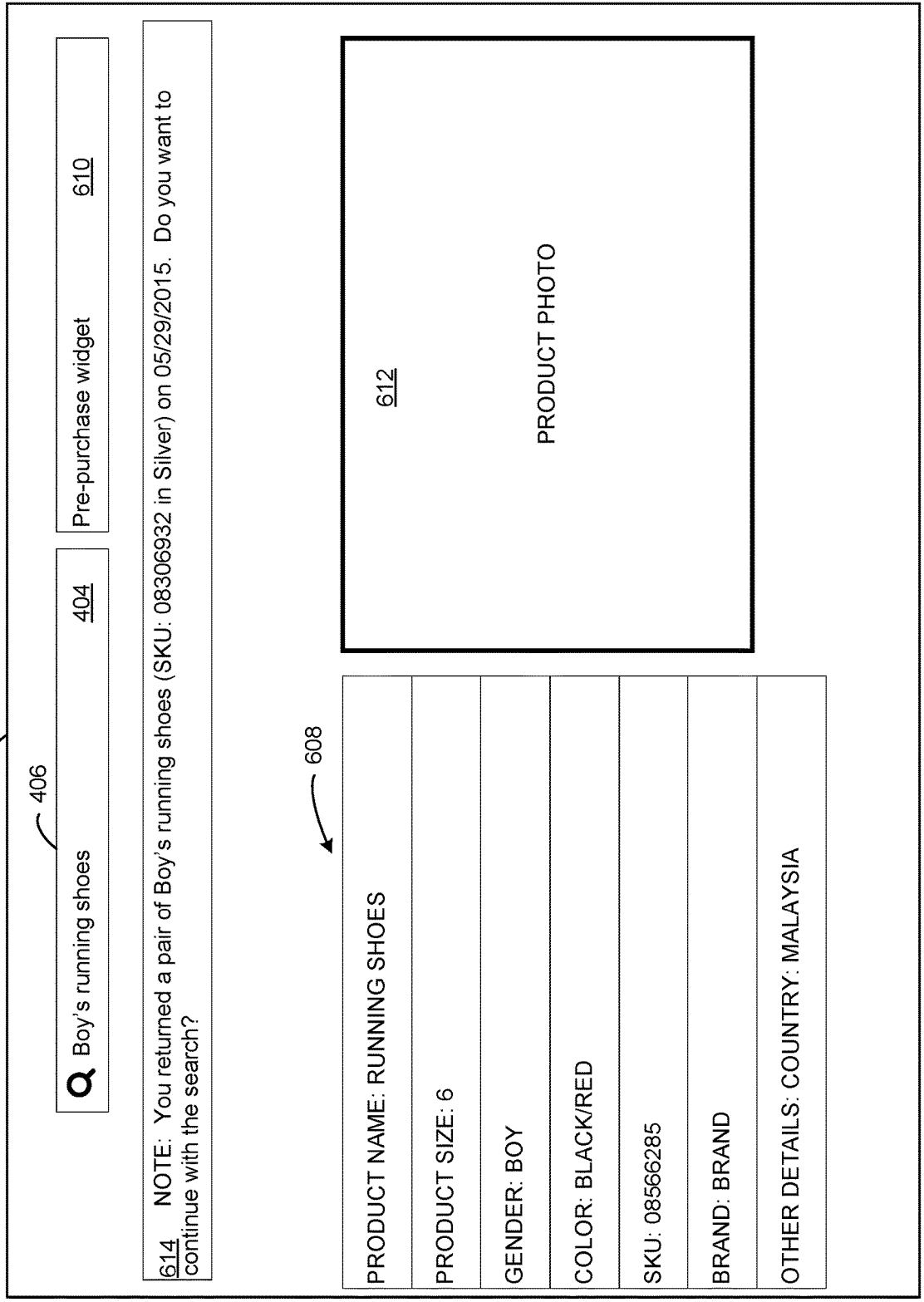

METHOD, SYSTEM AND COMPUTER-READABLE MEDIUM FOR GENERATING PRE-PURCHASING CONFIDENCE RECOMMENDATIONS FOR A USER

TECHNICAL FIELD

Embodiments of the invention generally relate to providing an improved system to generate online shopping recommendations.

BACKGROUND

Online shopping has been omnipresent as the convenience of online merchants has increased. The ease of purchasing goods and services in the comfort of one's home or without the need to visit a physical store has transformed shopping behaviors of consumers. In addition, returns or exchanges have also become quite streamlined.

Despite these conveniences, there are still shortcomings. For example, unless the user actively keeps tracks of the purchases in the past, either by finding the receipts of the purchases or searching email records for shipping records, the user may not recall details of the post-purchase, post-sale, or past purchases. Also, sometimes receipts or email records may not include all of the details, such as a serial number, a stock keeping unit (SKU) value, a universal product code (UPC) value, or the like.

In a certain situation, many consumers may rely on one online shopping platform for all of their online shopping needs. As such, the consumers may easily locate past shopping records. However, even in just one online shopping environment, returns or exchanges by the consumers may not be kept or organized in one location. Moreover, consumers purchase goods from many merchants or online sources. As such, suppose a consumer returned an item in the last six months or a year, but forgot the reasons for the returns or exchanges. Current implementations do not include a technical approach to provide a recommendation or a suggestion when the consumer is searching for a similar item again. This may cause the consumer to purchase a similar item or an identical item again and may end up returning the item again.

Therefore, embodiments of the invention attempt to solve or address one or more of the technical problems identified above.

SUMMARY

Embodiments of the invention may provide a technical solution by building an intelligent system to provide a recommendation or a suggestion to the user about post-purchase, post-sale, or past purchases. In one embodiment, a system provides a browser widget or an add-on tool that monitors user's purchasing and searching activities. Aspects of the invention actively identify and update product-specific parameters, such as a serial number, a stock keeping unit (SKU) value, a universal product code (UPC) value, or the like to the user's post-purchase, post-sale, or past purchase activities, including returns or exchanges. As such, embodiments of the invention, upon identifying a search term that is relevant to one of the product-specific parameters in the post-purchase, post-sale, or past purchase activities, provide a timely recommendation or notification to the user so that the user may either adjust its purchasing or searching behaviors or increase confidence regarding its pending purchase as a result of the searches.

BRIEF DESCRIPTION OF THE DRAWINGS

Persons of ordinary skill in the art may appreciate that elements in the figures are illustrated for simplicity and clarity so not all connections and options have been shown to avoid obscuring the inventive aspects. For example, common but well-understood elements that are useful or necessary in a commercially feasible embodiment may often not be depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein may be defined with respect to their corresponding respective areas of inquiry and study except where specific meanings have otherwise been set forth herein.

FIG. 1 is a screenshot illustrating a typical set of purchase history.

FIGS. 4A-6B are screenshots illustrating a browser widget according to one embodiment of the invention.

DETAILED DESCRIPTION

The present invention may now be described more fully with reference to the accompanying drawings, which form a part hereof, and which show, by way of illustration, specific exemplary embodiments by which the invention may be practiced. These illustrations and exemplary embodiments may be presented with the understanding that the present disclosure is an exemplification of the principles of one or more inventions and may not be intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Referring to FIG. 1, a screenshot 102 shows a typical post-purchase, post-sale, or past purchase record or history.

In one example, the screenshot 102 may include a graphical user interface (GUI), a web portal page, an HTML page, or the like. In one embodiment, the screenshot 102 may be presented on a user device, such as the device shown in FIG. 8 and supported by the server described in FIG. 9, to be further discussed in FIG. 3. In one example, the screenshot 102 may include a search bar 104 to enable a user to search one or more post-purchase, post-sale, or past purchases based on keywords, descriptions, or other parameters. The screenshot 102 further includes a table 106 displaying additional details of the post-purchase, post-sale, or past purchases. For example, the table 106 may include fields such as "Name," "Date of the Purchase," and "Price." For example, a record 108 in the post-purchase, post-sale, or past purchase history in the screenshot 102 may identify an item "Men's running shoes," purchased on March 24, 2017 at a price of $159.99.

Figure 2:
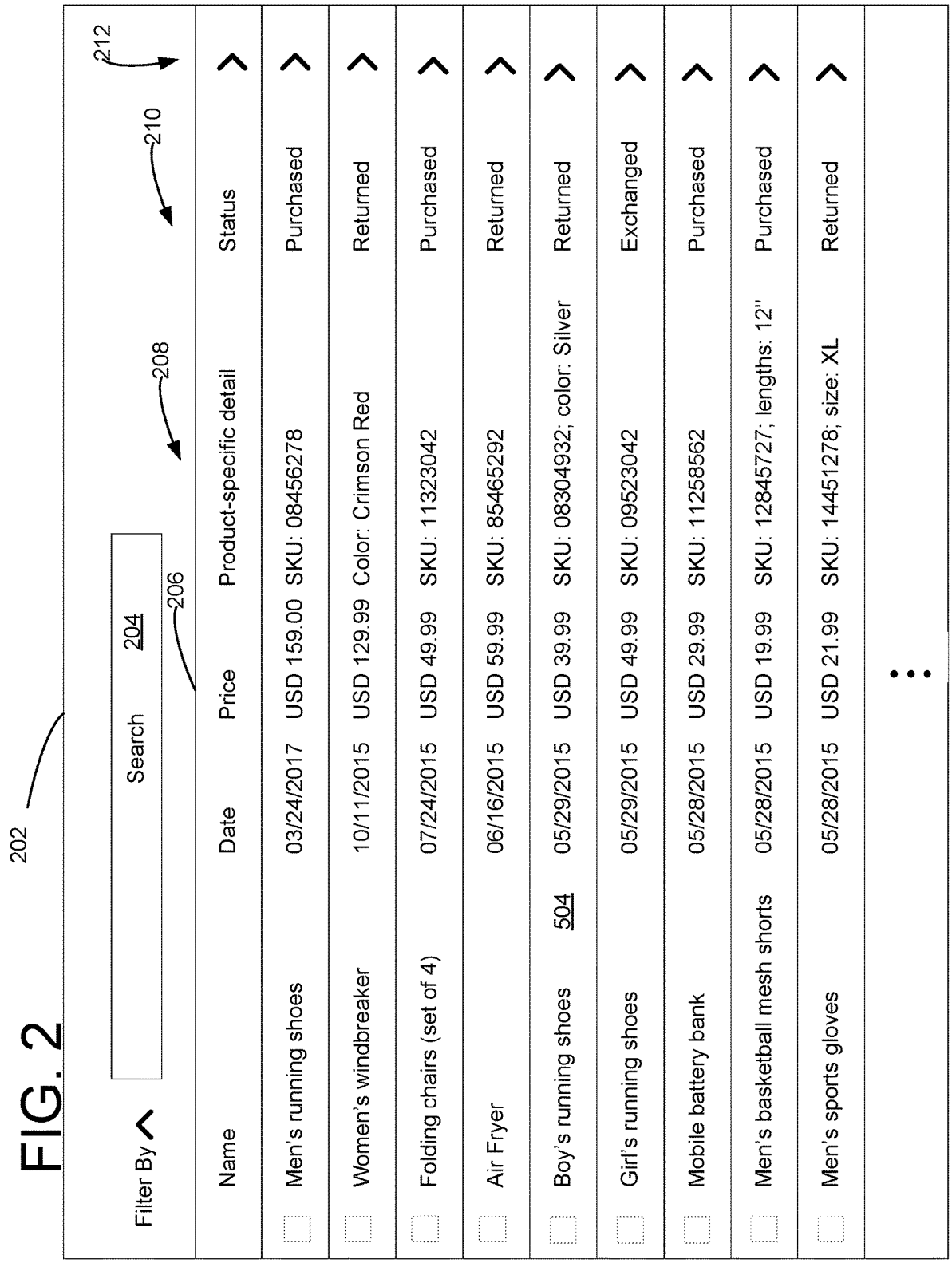
FIG. 2 is a screenshot illustrating a set of purchase history according to one embodiment of the invention.

Referring now to FIG. 2, an improved record of post-purchase, post-sale, or past purchase history is shown using a screenshot 202 as an example. For example, similar to FIG. 1, the screenshot 202 may also include a search bar 204 and a table 206 illustrating the contents thereof. However, aspects of the invention generate the improved record shown in the table 206 by adding product-specific details such as fields 208 and 210. For example, the product-specific detail field 208 may include a stock keeping unit (SKU) value, a universal product code (UPC) value, a size value, a color value, and/or a serial number. In one embodiment, the status field 210 identifies a status of the purchase, such as "purchased," "returned," "exchanged," etc. In one embodiment, the status field 210 may also show "recalled" if the post-purchase, post-sale, or past purchase has been recalled.

In one embodiment, the product-specific detail fields 208 and 210 may be gathered from the user, such that the screenshot 202 shows right arrows 212 to indicate that there may be more fields may be available. For example, the user may forward the purchase information to a system 300 in FIG. 3 so that the contents of the purchase may be identified or gathered. In one example, the user may set up an automatic forwarding for purchases to an email of the system 300 designated for analyzing such purchase information. The system 300 may maintain a database 312, separate from the user's own email system or computer systems.

For example, the system 300 may possess transactional records of the user stored in the database 312. In one embodiment, the system 300 may be a payment processor or acquirer and may be connected to a distributed network server 310. In another embodiment, the system 310 300 may provide a virtual wallet service 316 hosted by the server 310 where the user may store or save credit cards or other payment devices associated with the virtual wallet 316. For example, the virtual or digital wallet service may include VISA Checkout or other digital wallet services or apps. As such, when the user uses one of the payment devices associated with the virtual wallet 316, the system 300 may store a copy of such purchase transactions in the database 312 or 314. However, it is known such information may be incomplete and many times, when there is a return or exchange, the system 300 may not be able to reflect such post-transaction activities.

As such, the system 300 may supplement its records by receiving information from the user, such as the user devices 302-1 and 302-2, at a server 306. In one embodiment, the server 306 may also include processors to execute artificial intelligence (AI) algorithms to receive inputs from the user via a browser widget 304-2 and a mobile app 304-1 to search for the needed information on the Internet 318 to provide to the user a better shopping experience. In one embodiment, the system 300 may constantly crawl through the Internet 318 to identify product-specific details based on the shopping or transactional information from the user. For example, in one embodiment, the user may purchase a pair of shoes from a certain brand over the Internet. The system 300 may, based on the receipt or shipping email from the user, crawl through the Internet 318 pages to add SKU or other information. The system 300 may first identify information from the user's receipt or shipping email.

In another embodiment, the system 300 may supplement the information by establishing a separate communications with a merchant or a manufacturer 320. For example, the system 300, with the servers 306 and 310 may be coupled with the merchant or manufacturer server 320 to retrieve product information or details. As such, based on the stored data in the database 314 (based on data of the virtual wallet services 316) and the database 312, the system 300 may continuously and periodically provide supplement information to the post-purchase, post-sale, or past purchase record data provided by the user.

In one embodiment, the system 300 provides a widget, a tool, or an add-on, such as 304-1 and 34-2, on the user device. As part of installing the widget, a user may be informed of the data gathering aspect of the widget and agree to have the widget review past purchase data.

Referring now to FIG. 4A, a screenshot 402 illustrates one embodiment of the invention. In one example, the screenshot 402 includes a GUI to be presented on a mobile device or user device (such as the one in FIG. 8). In one embodiment, the screenshot 402 includes a search bar 406, and a search field. In one embodiment, the search field may receive input or query from the user. In another embodiment, the search bar 406 and the search field may be provided by a browser of a user device, such as 302-1 or 302-2, in a content display area 408 or 608 in FIGS. 6A and 6B. For example, the browser may enable the user to browse the Internet. In another embodiment, the browser may be part of an operating system, such as the operating system discussed in FIG. 8. In another embodiment, the browser may be a standalone software or application program. In a further example, the browser or the operating system may be part of a mobile device that may configured to fit within the limited sized screen. In yet another embodiment, the browser may be a mobile application or app that may be installed on the mobile device.

Still referring to FIG. 4A, the user may use the screenshot 402 to search for products on the Internet as an intent to shop or performing an "online window shopping". According to one embodiment, a pre-purchase widget 410 may be provided as an add-on or a widget. The pre-purchase widget 410 may be installed with the operating system of the user device. In yet another embodiment, the pre-purchase widget 410 may be installed as an app on a mobile device and may not be visible to the user but may have access to searches, etc., of another app, such as the browser app.

Referring now to FIG. 4B, the pre-purchase widget 410 may monitor user's inputs or queries in the search bar 406. For example, the user's query 404 may be "Boy's running shoes". In response to the query, the browser may display one or more search results, such as the result 416, in the content display area 408. In this example, the result 416 may include descriptions of one of the results that is most relevant to the query 404. The descriptions may further include a photography 412 of the one of the results 416.

As the user enters the query 404, the pre-purchase widget 410 may also monitor the query 404. For example, the pre-purchase widget 410 may search a data store storing post-purchase, post-sale, or past purchase records, such as those shown in FIG. 2 and the system 300 in FIG. 3.

Figure 5:
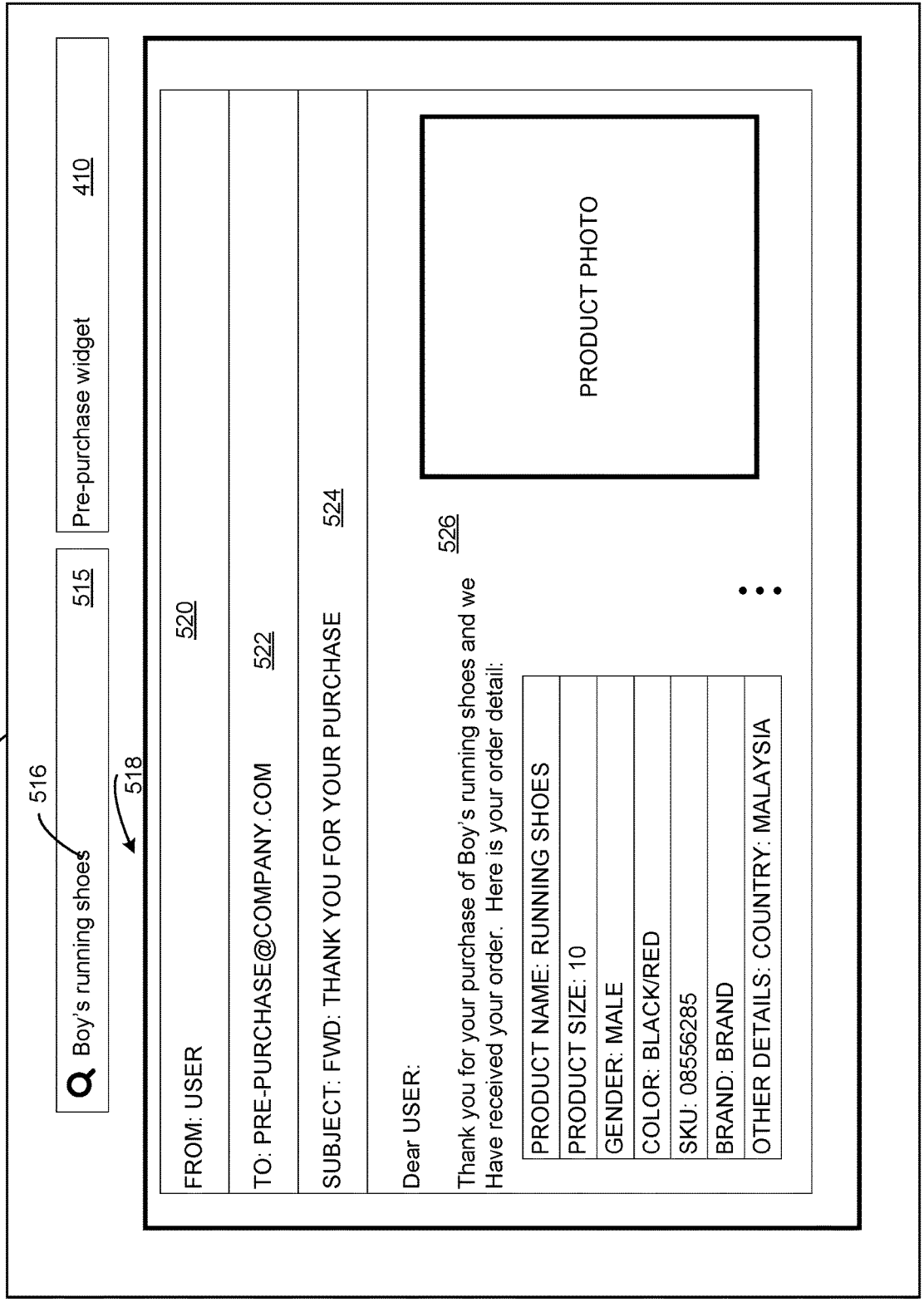

Referring to FIG. 5, another embodiment of the pre-purchase widget 410 may be provided to the user. In this embodiment, the pre-purchase widget 410 may access post-purchase, post-sale, or past purchase records or history from the user via an email. As such, FIG. 5 illustrates a screenshot 512 showing the user sending purchase information in an email to the system. For example, the screenshot 512 may be part of the browser as discussed above, or part of an email client application. For example, the user may enter his or her email address at 520, entering email account, ishop@company.com or pre-purchase@company.com at 522 for the server for the pre-purchase widget 410, entering a subject at 524, and the content of the message 526. In one embodiment, the server in the system 300 may execute codes and programs through the pre-purchase widget 410 to interact with the user.

As seen in FIG. 5, the pre-purchase widget 410 may also be added or implemented in the email client application. As such, it is to be understood that the pre-purchase widget 410 may be implemented as one may see fit to gather information for the user regarding post-purchase, post-sale or past purchase activities.

Figure 6B:
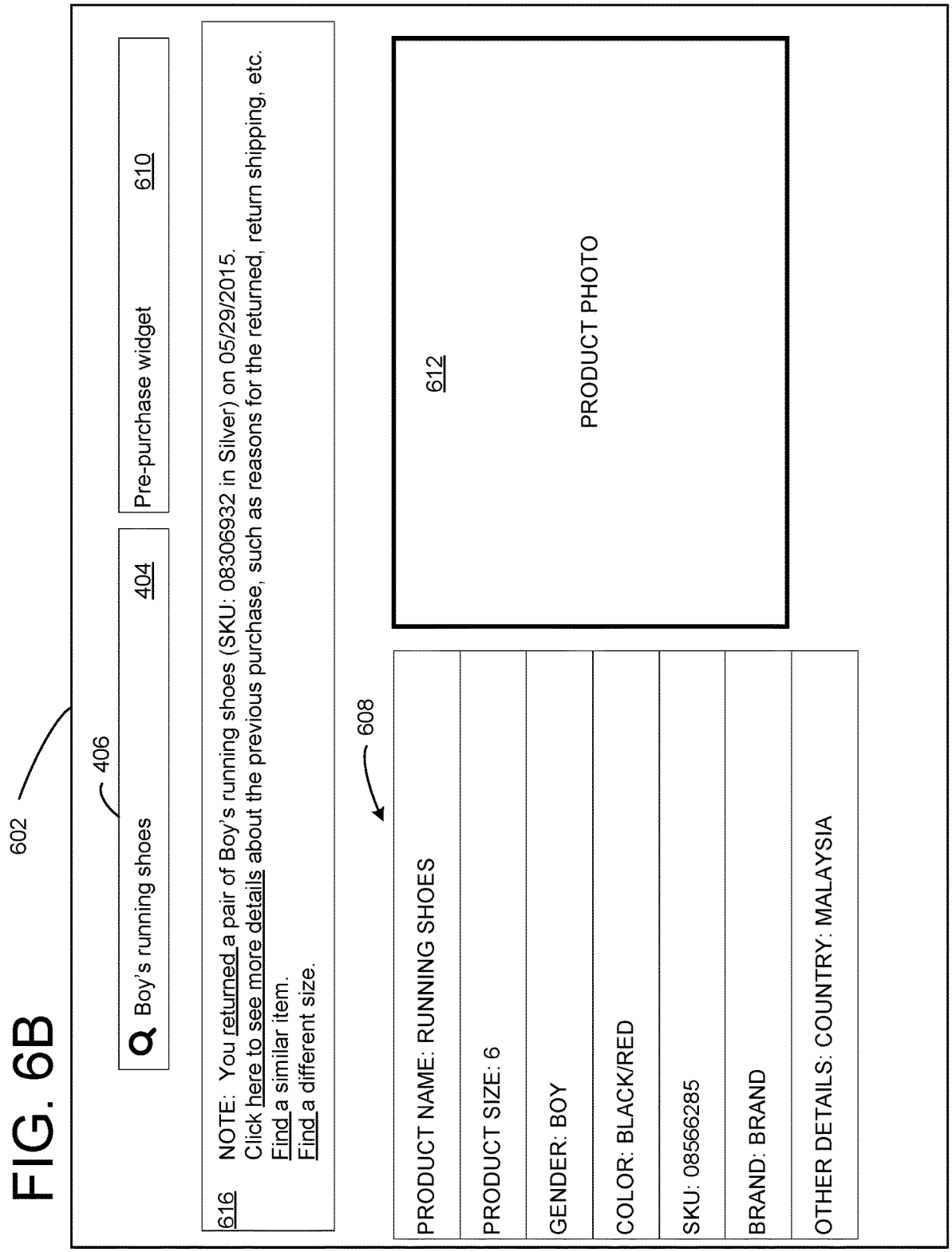

Referring now to FIGS. 6A and 6B, a screenshot 602 shows aspects of the invention. For example, as discussed above, the user has entered the query 404 "Boy's running shoes" into the search bar 406. The pre-purchase widget 610 may, in one embodiment, constantly monitor the user input or query 404. As the pre-purchase widget 610 monitors the input or query 404, the system 300 may compare with the input or query 404 with the post-purchase, post-sale, or past purchase activities, such as the post-purchase or post-sale activities, purchase history, or the like. In response to a match between the input or query 404 and one of the items in the post-purchase, post-sale, or past purchase records, the pre-purchase widget 601 may provide a notification or indicia on the browser or application on the user device.

As part of the illustration, the record 504 in FIG. 2, which shows that the user has purchased a similar item on May 29, 2015. In addition, the item was later returned based on the "status" field. The product-specific detail further includes data such as "SKU: 08304932" and "color: silver." The system 300 determines that there is a match between the query 404 and the record 504, and provides a notification 614 with the message:

NOTE: You returned a pair of Boy's running shoes (SKU: 08306932 in Silver) on May 29, 2015. Do you want to continue with the search?

In other words, embodiments of the invention provide a holistic approach to the user's shopping experience by providing a pre-purchase recommendation or suggestion based on the post-purchase, post-sale, or past purchase activities and current searches. In one embodiment, the system 300 correlates the product-specific parameters with the post-purchase, post-sale, or past purchase activities. In one embodiment, the correlation may be stored as associated with the user as a user profile, etc.

In another embodiment, as shown in FIG. 6B, a different notification 616 may provide additional interactive features. For example, the message may be:

NOTE: You returned a pair of Boy's running shoes (SKU: 08306932 in Silver) on May 29, 2015.

Click heretoseemoredetails about the previous purchase, such as reasons for the returned, return shipping, etc.
Find a similar item.
Find a different size.

Each of the underlined may include an active hypertext link which may redirect the user to a different page that provides additional content based on the context. For example, the "returned" link may provide details of the return, such as the tracking number, date of the return, and whether the return was accepted. In another embodiment, "click here to see more details," may provide details of the reasons of the return. In another embodiment, "find" a similar item, may redirect the user to another page or tab of a similar item from different brands, etc. Similarly, "find" a bigger size may redirect the user to another page containing the same product such that the user may select a different size. In one embodiment, the user may be directed to a newer version of the same product if previously purchased product has been recalled or discontinued. As such, aspects of the invention provide a comprehensive set of information in the pre-purchase stage. The user may then make an informed decision or a faster decision on whether to search for the same item or a different item based on the post-purchase, post-sale, or past purchase activities.

In one embodiment, the notification, suggestion, recommendation, or indicia 614 and 616 may be provided in real-time or substantially in real-time. As such, the user may be able to quickly make the decision.

Figure 7:
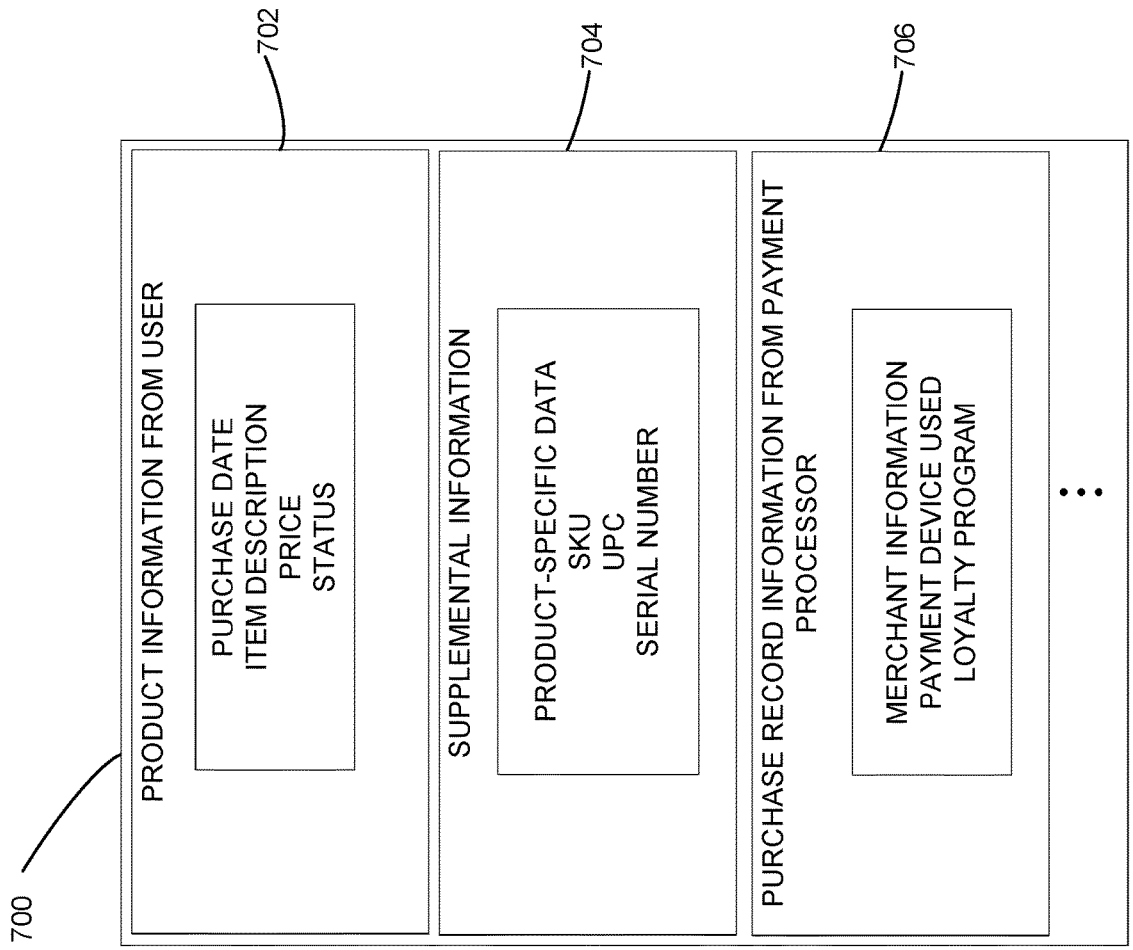
FIG. 7 is a diagram illustrating a data structure of an improved purchase history according to one embodiment of the invention.

Referring now to FIG. 7, a data structure 700 illustrates for storing the post-purchase, post-sale, or past purchase activity records according to one embodiment of the invention. For example, the data structure includes a first data field 702, a second data field 704, and a third data field 706. The first data field 702 includes product information from the user, such as purchase data, item description, price, and status. In one embodiment, the product information from the user may be sent from the user via sending the information to the system 300 or providing permissions to the system 300 to scan the user's email or other sources. In another embodiment, the user may also provide the product information to the system 300 by using the app 304-2 in the mobile device 302-2 to capture an image of a receipt with product information. In another embodiment, the status data may be gathered in response to a post-return feedback from the user. For example, the post-return feedback may be part of the user return process and the feedback is included in the first data field 702.

The second data field 704 may include supplemental information, including product-specific data. For example, the product-specific data may include a SKU value of a product, an UPC value of a product, a serial number of a product, a sizing information of a product, a color information of a product, or the like. In another embodiment, the supplemental information may be obtained by a crawler, which is a small program that searches through the websites or public computer networks based on a specific keyword or search criteria. In another embodiment, the supplemental information may be obtained or received from a third party source, such as a merchant or a manufacturer. In one embodiment where the user sends an image of the receipt, the SKU value, color value, size value, etc., may be available on the receipt.

Furthermore, the third data field 706 may include other supplemental information, such as purchase record or data retrieved or obtained from a payment processor. For example, the payment processor may include data such as the kind of payment device used, merchant information, loyalty program information, or the like. In another embodiment, the inclusion of the third data field 706 may be subjected to user permission or opt-out consent. In another embodiment, the third data field 706 may be automatically accessible to the system 300 by virtue of the user's usage of the virtual wallet.

It is to be understood that the data structure 700 may be maintained at a user-level database distinguishable over other users based on the user ID or other unique identifying value.

Figure 3:
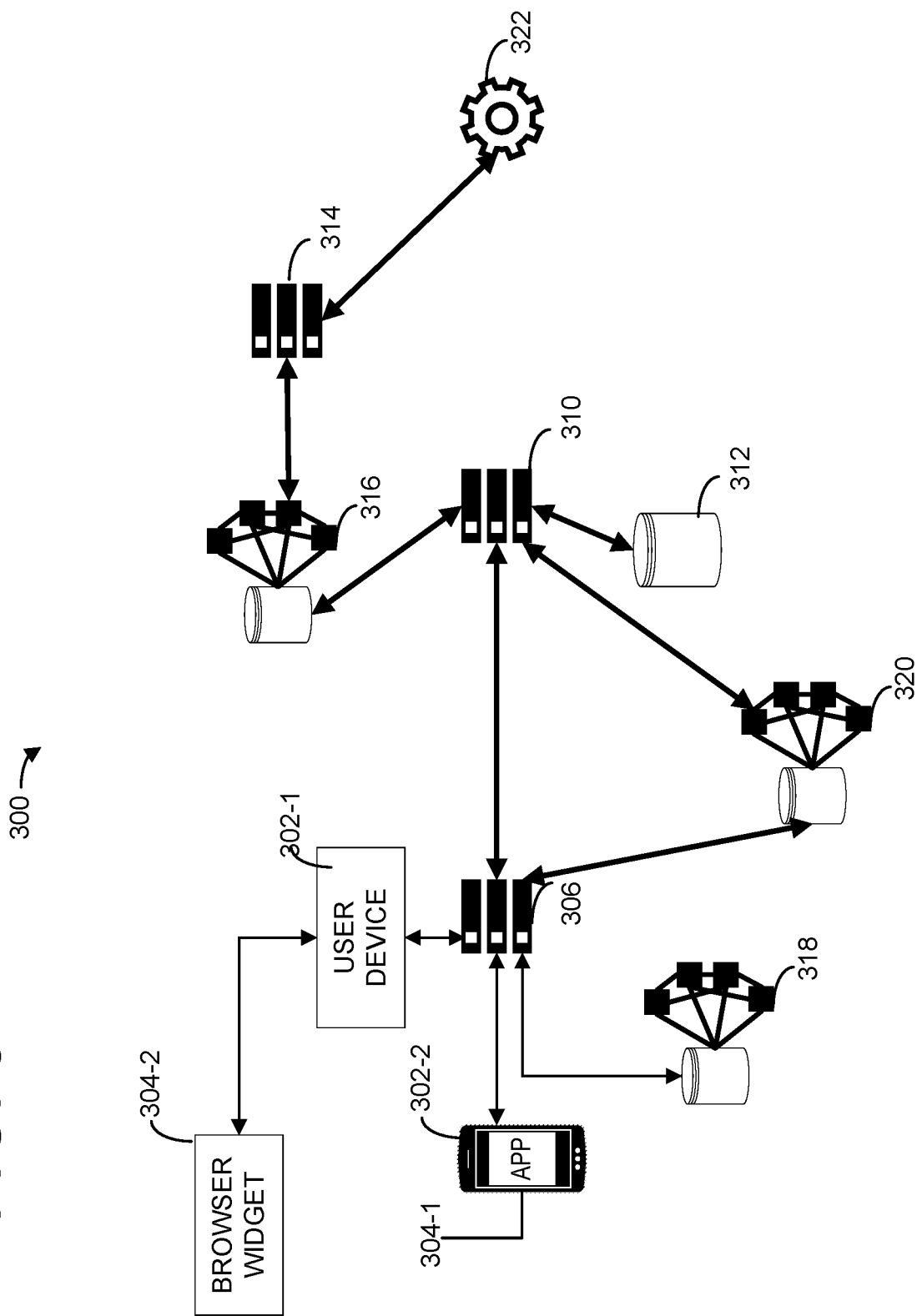
FIG. 3 is a diagram illustrating a system for providing pre-purchase recommendations according to one embodiment of the invention.

In another embodiment, the data structure 700 may include additional information volunteered from the user. For example, as shown in FIG. 3, the system may include a configuration portal 322, which may enable the user to enter individualized information for the virtual wallet service 316. For example, the configuration portal 322 may enable the user to access and update the database 314 with preference parameter information, such as size value, color information, favorite brand information, favorite style, etc. In a further embodiment, the user may use the configuration portal 322 to alter or modify scanning permissions by the system 300. The servers 306 and 310 may incorporate the additional information volunteered from the user to the data structure 700 for crawling or making recommendation purposes.

Figure 8:
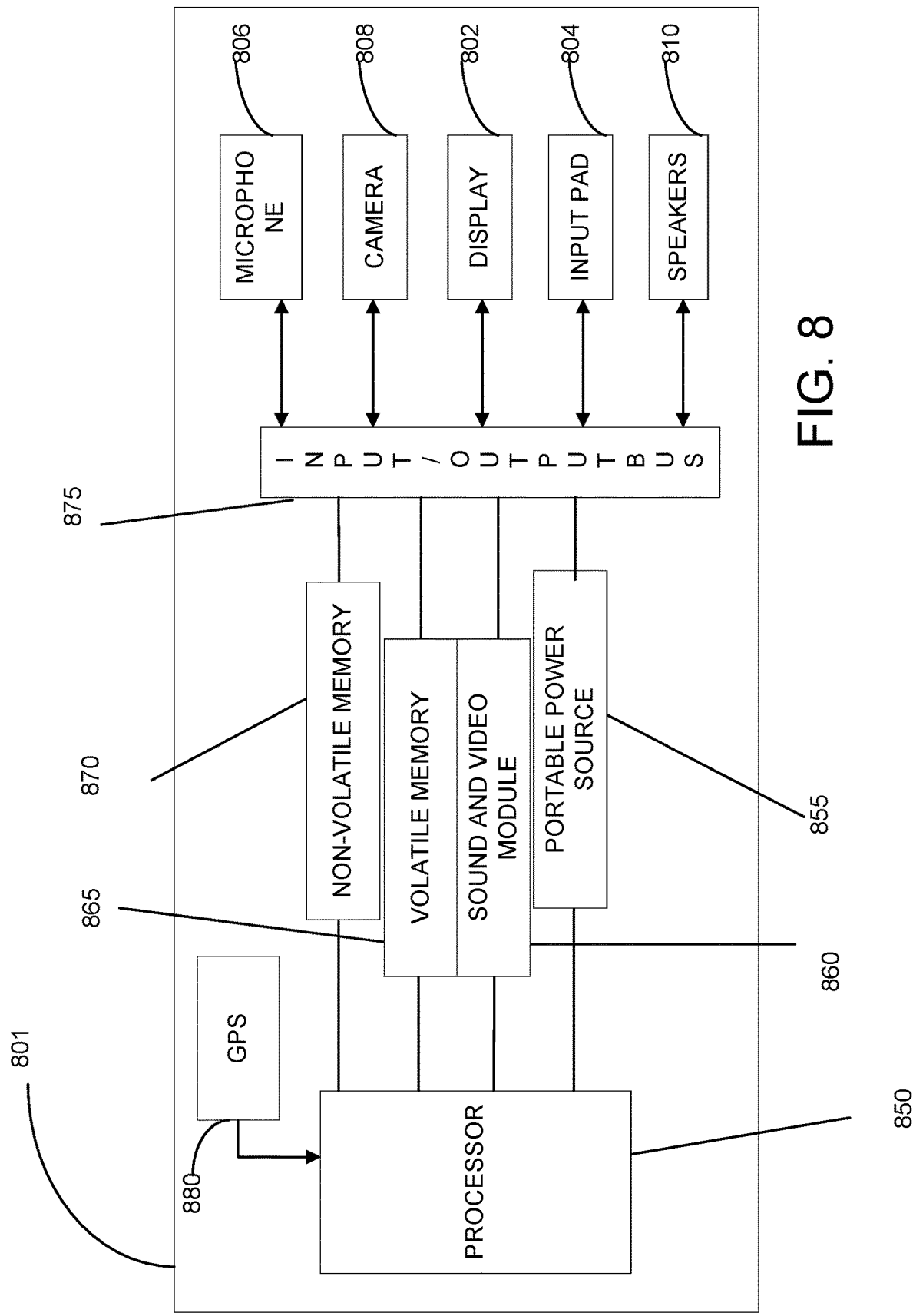
FIG. 8 is a diagram illustrating a portable computing device according to one embodiment of the invention.

FIG. 8 may be a high level illustration of a portable computing device 801 communicating with a remote computing device 841 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages, and different API platforms.

In one embodiment, a portable computing device 801 may be a mobile device 112 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 841 or may be through a communication network 102 such as cellular service, through the Internet, through a private network, through Bluetooth, etc. FIG. 8 may be a simplified illustration of the physical elements that make up a portable computing device 801 and FIG. 9 may be a simplified illustration of the physical elements that make up a server type computing device 841.

FIG. 8 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have volatile memory 865 and non-volatile memory 870. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc. It also may control of communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

Figure 9:
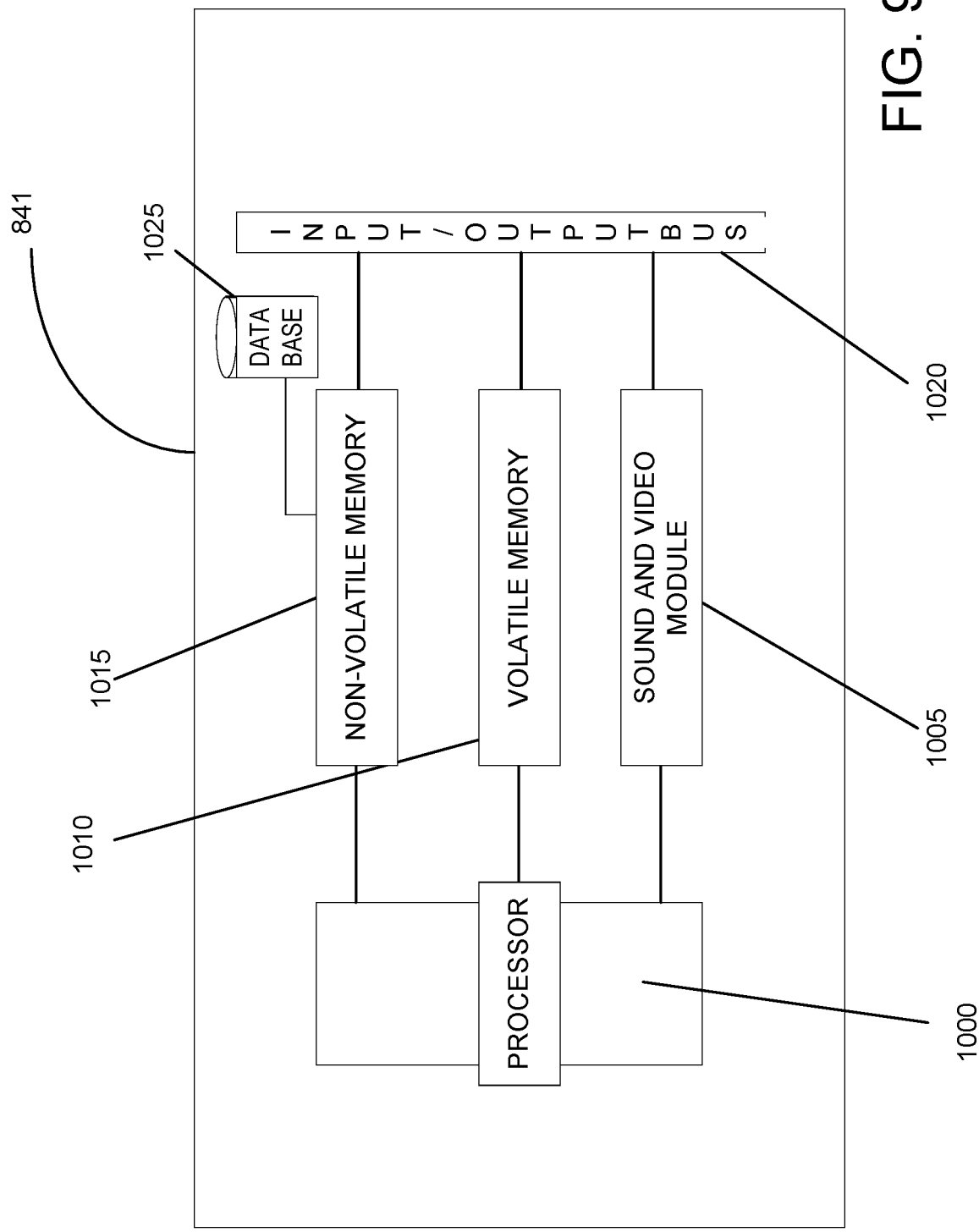
FIG. 9 is a diagram illustrating a remote computing device according to one embodiment of the invention.

The physical elements that make up the remote computing device 841 may be further illustrated in FIG. 9. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein may be general purpose computers that may have, among other elements, a microprocessor (such as from the Intel Corporation, AMD, ARM, Qualcomm, or MediaTek); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, iOS, Android, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

Figure 10:
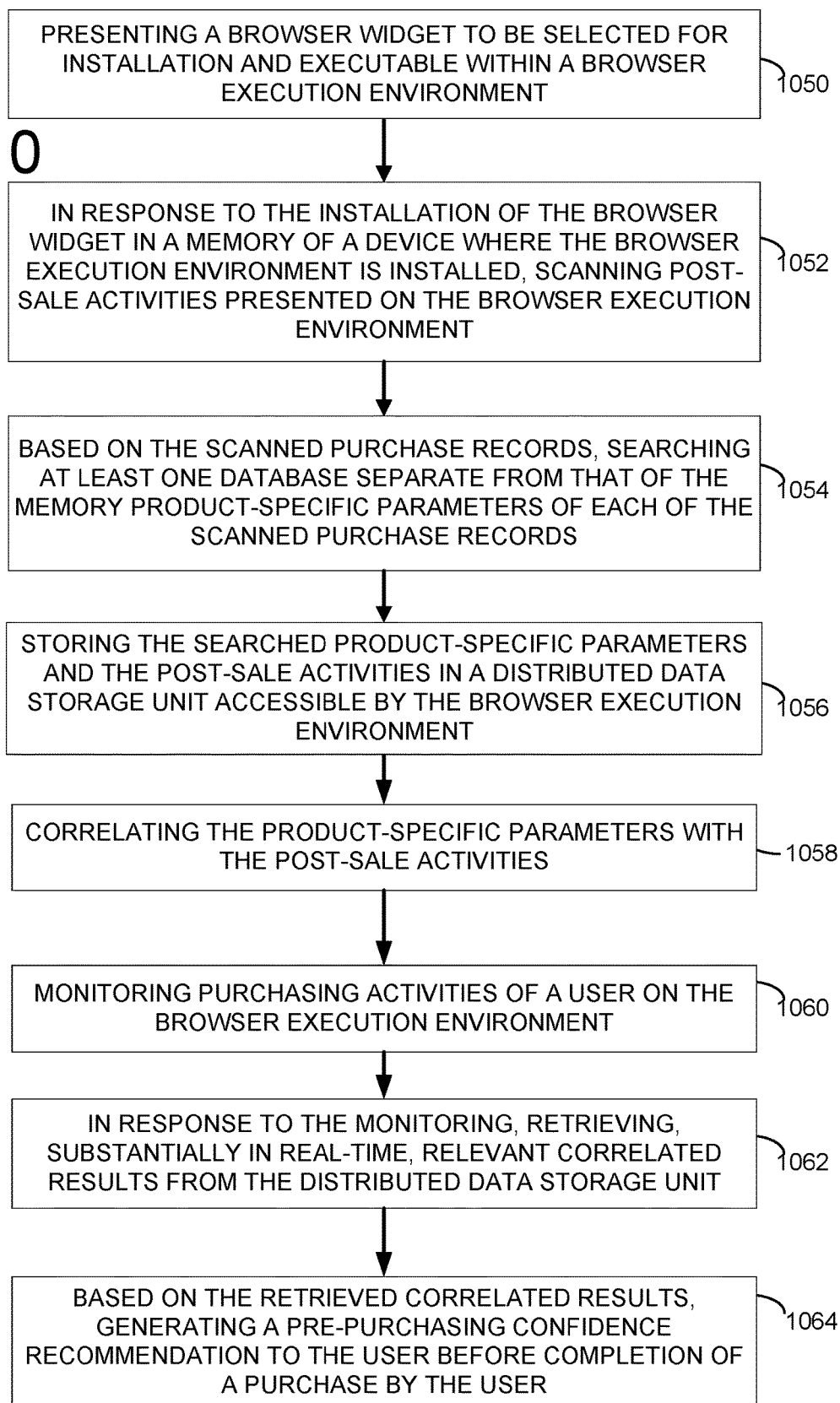
FIG. 10 is a flow chart illustrating a pre-purchase recommendation notification method according to one embodiment of the invention.

Referring now to FIG. 10, a flow chart illustrates a method of generating pre-purchase recommendations according to one embodiment of the invention. At 1050, aspects of the invention present a browser widget to be selected for installation and executable within a browser execution environment. In one example, the browser widget may be add-on scripts to be executed by the browser execution environment. Information about the data collected, how it is stored, how it is used and how it may be shared may also be described and a user may be able to adjust how the data is used or deny permission all together. At 1052, in response to the installation of the browser widget in a memory of a device where the browser execution environment is installed, embodiments of the invention scan purchase records of post-sale activities presented on the browser execution environment. In one embodiment, the system 300 scan a data source, such as those in 312, 314, and/or 318. In another embodiment, the system 300 may scan contents presented in the browser execution environment. In a further embodiment, the system 300 may receive data from post-sale activities from the user via emails or other communications from the user. For example, the user may upload receipts or other evidence of sale to the system 300 via the virtual wallet service 316.

At 1054, based on the scanned purchase records, the system 300 further searches at least one database separate from that of the memory for product-specific parameters of each of the scanned purchase records. In one example, the product-specific parameters include at least one or more of the following: a stock keeping unit (SKU) value, a universal product code (UPC) value, a size value, and a color value. In another embodiment, the product-specific parameters may also include serial numbers. At 1056, the system 300 may further store the searched product-specific parameters and the post-sale activities in a distributed data storage unit accessible by the browser execution environment. In another embodiment, at 1058, the system 300 may correlate the product-specific parameters with the post-sale activities. In one example, the correlated results are stored in the distributed data storage unit. At 1060, the system 300 may monitor purchasing activities of a user on the browser execution environment. For example, the purchasing activities may include a search or query on a search bar. In another embodiment, the purchasing activities may further include a selection or highlighting of an item.

In response to the monitoring, the system 300 may retrieve, substantially in real-time, relevant correlated results from the distributed data storage unit at 1062. At 1064, based on the retrieved correlated results, the system 300 may generate a pre-purchasing confidence recommendation to the user before completion of a purchase by the user. In another embodiment, the system 300 may execute computer-executable instructions according to that of FIG. 10. In another embodiment, at least a portion of the instructions according to FIG. 10 may be implemented via the browser widget 410 and 610.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving transaction data using two-dimensional code. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

What is claimed is:

1. A computer-implemented method for generating pre-purchasing confidence recommendations for a user comprising:
    presenting a browser widget to be selected for installation and executable within a browser execution environment, wherein the browser widget provides functionality within the browser execution environment only and is presented to the user as an icon on a graphical user interface (GUI) of the browser execution environment;
    in response to the installation of the browser widget in a memory of a device where the browser execution environment is installed and in response to search queries input by the user in a search bar presented on the GUI of the browser execution environment, scanning, via the browser widget, purchase records for a first set of post-sale activities and electronic mail messages for another set of post-sale activities, wherein the first set of post-sale activities and the another set of post-sale activities are associated with at least: a return request of a past purchased item, an acceptance from a merchant of the return request, an exchange request of a past purchased item, or a feedback of a past purchased item from the user;
    presenting the scanned purchase records that include the post-sale activities in a content display area on the browser execution environment;
    based on the scanned purchase records as presented in the content display area, searching at least one database separate from that of the memory for product-specific parameters of each purchase record of the scanned purchase records, said product-specific parameters including at least one or more of the following: a stock keeping unit (SKU) value, a universal product code (UPC) value, a size value, and a color value;
    storing the searched product-specific parameters and the post-sale activities in a distributed data source accessible by the browser execution environment;
    correlating and updating, absent user input, the product-specific parameters with the post-sale activities, wherein correlated results are stored in the distributed data source;
    monitoring purchasing activities of the user on the browser execution environment;
    in response to the monitoring, retrieving, substantially in real-time, relevant correlated results from the distributed data source; and
    based on the retrieved correlated results, generating a pre-purchasing confidence recommendation at a predetermined notification location of the GUI of the browser execution environment to the user while the content display area of the browser execution environment displays the scanned purchase records before completion of a purchase by the user.

2. The computer-implemented method of claim 1, wherein generating comprises generating the pre-purchasing confidence recommendation to the user in response to the user adding an item to an online shopping cart.

3. The computer-implemented method of claim 1, wherein generating comprises generating the pre-purchasing confidence recommendation to the user in response to the user searching for an item matching one of the product-specific parameters from the distributed data storage unit.

4. The computer-implemented method of claim 1, further comprising receiving input from the user, said input comprising personal preferences of products.

5. A computer system for generating pre-purchasing confidence recommendations comprising:
    a memory of a user device for storing applications and data;
    a display of the user device for presenting graphical user interfaces (GUI) of a browser execution environment to a user;
    a processor configured to execute computer-executable instructions, wherein the processor is accessible by the memory, wherein the processor is configured to execute computer-executable instructions for:
    presenting a browser widget to be selected by the user via the display of the user device for installation and executable within a browser execution environment on the user device, wherein the browser widget provides functionality within the browser execution environment only and is presented to the user as an icon on the graphical user interface (GUI) of the browser execution environment;
    in response to the installation of the browser widget in the memory of the user device and in response to search queries input by the user in a search bar presented on the GUI of the browser execution environment, scanning, via the browser widget, purchase records a first set of post-sale activities and electronic mail messages for another set of post-sale activities, wherein the first set of post-sale activities and the another set of post-sale activities are associated with at least: a return request of a past purchased item, an acceptance from a merchant of the return request, an exchange request of a past purchased item, or a feedback of a past purchased item from the user;
    presenting the scanned purchase records that include the post-sale activities in a content display area on the browser execution environment;

based on the scanned purchase records as presented in the content display area, searching at least one database separate from that of the memory for product-specific parameters of each purchase record of the scanned purchase records, said product-specific parameters including at least one or more of the following: a stock keeping unit (SKU) value, a universal product code (UPC) value, a size value, and a color value;

storing the searched product-specific parameters and the post-sale activities in a distributed data source accessible by the browser execution environment;

correlating and updating, absent user input, the product-specific parameters with the post-sale activities, wherein correlated results are stored in the distributed data source;

monitoring purchasing activities of the user on the browser execution environment;

in response to the monitoring, retrieving, substantially in real-time, relevant correlated results from the distributed data source; and based on the retrieved correlated results, generating a pre-purchasing confidence recommendation at a predetermined notification location of the GUI of the browser execution environment to the user while the content display area of the browser execution environment displays the scanned purchase records before completion of a purchase by the user.

6. The computer system of claim 5, wherein generating comprises generating the pre-purchasing confidence recommendation to the user in response to the user adding an item to an online shopping cart.

7. The computer system of claim 5, wherein generating comprises generating the pre-purchasing confidence recommendation to the user in response to the user searching for an item matching one of the product-specific parameters from the distributed data storage unit.

8. The computer system of claim 5, further comprising receiving input from the user, said input comprising personal preferences of products.

9. The computer system of claim 5, wherein the purchasing activities comprise searches entered in a search bar.

10. A tangible non-transitory computer-readable medium stored thereon computer-executable instructions for generating pre-purchasing confidence recommendations, said computer-executable instructions comprising:

presenting a browser widget to be selected by a user via a display of a user device for installation and executable within an execution environment on the user device, wherein the browser widget provides functionality within the browser execution environment only and is presented to the user as an icon on a graphical user interface (GUI) of the execution environment;

in response to the installation of the browser widget in a memory of the user device and in response to search queries input by the user in a search bar presented on the GUI of the execution environment, scanning, via the browser widget, purchase records for a first set of post-sale activities and electronic mail messages for another set of post-sale activities, wherein the first set of post-sale activities and the another set of post-sale activities are associated with at least: a return request of a past purchased item, an acceptance from a merchant of the return request, an exchange request of a past purchased item, or a feedback of a past purchased item from the user;

presenting the scanned purchase records that include the post-sale activities in a content display area on the execution environment;

based on the scanned purchase records as presented in the content display area, searching at least one database separate from that of the memory for product-specific parameters of each purchase record of the scanned purchase records, said product-specific parameters including at least one or more of the following: a stock keeping unit (SKU) value, a universal product code (UPC) value, a size value, and a color value;

storing the searched product-specific parameters and the post-sale activities in a distributed data source accessible by the execution environment;

correlating and updating, absent user input, the product-specific parameters with the post-sale activities, wherein correlated results are stored in the distributed data source;

monitoring purchasing activities of the user on the execution environment;

in response to the monitoring, retrieving, substantially in real-time, relevant correlated results from the distributed data source; and based on the retrieved correlated results, generating a pre-purchasing confidence recommendation at a predetermined notification location of the GUI of the execution environment to the user while a content display area of the execution environment displays the scanned purchase records before completion of a purchase by the user.

11. The tangible non-transitory computer readable medium of claim 10, wherein generating comprises generating the pre-purchasing confidence recommendation to the user in response to the user adding an item to an online shopping cart.

12. The tangible non-transitory computer readable medium of claim 10, wherein the purchasing activities comprise searches entered in a search bar presented in the execution environment.

* * * * *